(12) United States Patent
Ahuja et al.

(10) Patent No.: US 6,222,837 B1
(45) Date of Patent: Apr. 24, 2001

(54) INTERNET SERVICE VIA ISDN

(75) Inventors: Sudhir Raman Ahuja, Little Silver; Murali Aravamudan, Freehold, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 08/938,538

(22) Filed: Sep. 26, 1997

(51) Int. Cl.[7] .......................... G08C 15/00; H04L 12/66
(52) U.S. Cl. .......................... 370/352; 370/438; 370/264; 370/230; 370/524
(58) Field of Search .......................... 370/412, 352, 370/353, 354–356, 389, 400, 264, 401, 230, 524, 522, 438; 379/257, 167, 27, 211, 221; 710/68; 709/239, 227

(56) References Cited

U.S. PATENT DOCUMENTS

| | | | |
|---|---|---|---|
| 4,996,685 | * | 2/1991 | Farese et al. .......................... 370/352 |
| 5,463,629 | | 10/1995 | Ko .......................... 370/110.1 |
| 5,615,213 | * | 3/1997 | Griefer .......................... 370/412 |
| 5,815,505 | * | 9/1998 | Mills .......................... 370/522 |
| 5,881,142 | * | 3/1999 | Frankel et al. .......................... 379/167 |
| 5,931,928 | * | 8/1999 | Brennan et al. .......................... 710/68 |
| 6,073,176 | * | 6/2000 | Baindur et al. .......................... 709/227 |
| 6,115,460 | * | 9/2000 | Crowe et al. .......................... 379/211 |

OTHER PUBLICATIONS

European Search Report dated Jun. 17, 1999 for Application No. EP 98 30 7219.

* cited by examiner

Primary Examiner—Hassan Kizou
Assistant Examiner—John Pezzlo
(74) Attorney, Agent, or Firm—Eugene J. Rosenthal (57) ABSTRACT

Enhanced Internet service is provided over an ISDN line by eliminating from the D-channel any packets that will introduce unacceptable delay in packets transmitted over the B-channel. The enhancement is achieved by segregating the packets between the B-channels and the D-channel based on the stream to which the packets belong. Furthermore, instead of bonding together both B-channels and the D-channel, only the B-channels may be bonded to each other, while the D-channel is kept independent. To do so, instead of using MLPPP over the combination of both B-channels and the D-channel, as in the prior art, MLPPP is used over only both B-channels, while data that is separately directed to the D-channel employs another protocol, e.g., PPP. Advantageously, the number of protocols used to transmit the information over the D-channel may be reduced, resulting in a higher bandwidth for applications.

32 Claims, 4 Drawing Sheets

INTERNET SERVICE VIA ISDN

TECHNICAL FIELD

This invention relates to the providing of Internet protocol (IP) based data service, and more particularly, for providing Internet service using the D-channel of an integrated services digital network (ISDN) line.

BACKGROUND OF THE INVENTION

It is well known in the art that Internet service can be provided over an integrated services digital network (ISDN) line. One such service utilizes multilink point-to-point protocol (MLPPP). MLPPP has been used to bond the two ISDN B-channels to provide Internet service at 128 Kbps. In addition, there is a proposal to allow the D-channel of an ISDN line to be bonded to the two B-channels, thus providing Internet service at approximately 144 Kbps. However, this proposal suffers from several drawbacks.

First, because the Internet protocol (IP) traffic is divided only according to available bandwidth, without regard for the type of application in which the packet is going to be used at its destination, packets for continuous media applications, e.g., audio or video, may wind up being transmitted over the D-channel. As is well known, the D-channel is a packet switched data channel, and so it has unpredictable delays. Consequently, it is unknown when a packet that is sent over the D-channel will arrive at its destination.

When using MLPPP for Internet service, all the packets must be reordered upon receipt at the first IP access server, e.g., a gateway or a router, to the order in which they were transmitted. Since some of packets that require reordering may have been sent over the D-channel, and this may have resulted in a significant delay, the release of packets that were transmitted and received over the B-channel may be correspondingly delayed while awaiting for the arrival of a D-channel packet that precedes them in order. Thus, the delay of the D-channel causes delays in the B-channel. In other words, packets sent over the D-channel may hold packets sent over the B-channel "hostage".

As a result of such delays, continuous media applications may suffer from poor performance. Also, for continuous media applications, the buffer requirements at the access server is increased because the packets from the B-channel must be stored until any preceding packets from the D-channel arrives.

Second, because packets over the D-channel used with MLPPP are in the well known X.25 format, the information transmitted is preceded by several different protocol layer packet headers. Thus, the use of MLPPP and X.25 introduce unnecessary complexity, while reducing the effective bandwidth available for information transfer.

SUMMARY OF THE INVENTION

We have recognized that enhanced Internet service can be achieved over an ISDN line by eliminating from the D-channel any packets that will introduce unacceptable delay in packets transmitted over the B-channel, which may occur for continuous media applications transmitted as in the prior art described above. The enhancement is achieved by segregating the packets between the B-channels and the D-channel based on the stream to which the packets belong. Furthermore, in accordance with an aspect of the invention, instead of bonding together both B-channels and the D-channel, as in the prior art, only the B-channels may be bonded to each other, while the D-channel is kept independent. To do so, in one embodiment of the invention, instead of using MLPPP over the combination of both B-channels and the D-channel, as in the prior art, MLPPP is used over only both B-channels, while data that is separately directed to the D-channel employs another protocol, e.g., point-to-point protocol (PPP). Advantageously, the number of protocols used to transmit the information over the D-channel may be reduced, resulting in a higher bandwidth for applications.

In an exemplary embodiment of the invention, packets for continuous media applications, such as voice and video, are identified by examining the source, destination, and type information in the packet header. These packets are prevented from being transmitted via the D-channel, and instead are purposely placed only within the B-channel by the endpoint, e.g., via software that is interposed between the TCP/IP protocol stack and the link layer protocol stack. Other packets, which are also identified by examining the source, destination, and type information in the packet header, such as containing information for push-content model applications, active directory, or home appliance related information, are sent over the D-channel.

Packets may also be limited to being sent only over the D-channel.

DETAILED DESCRIPTION

Figure 1:
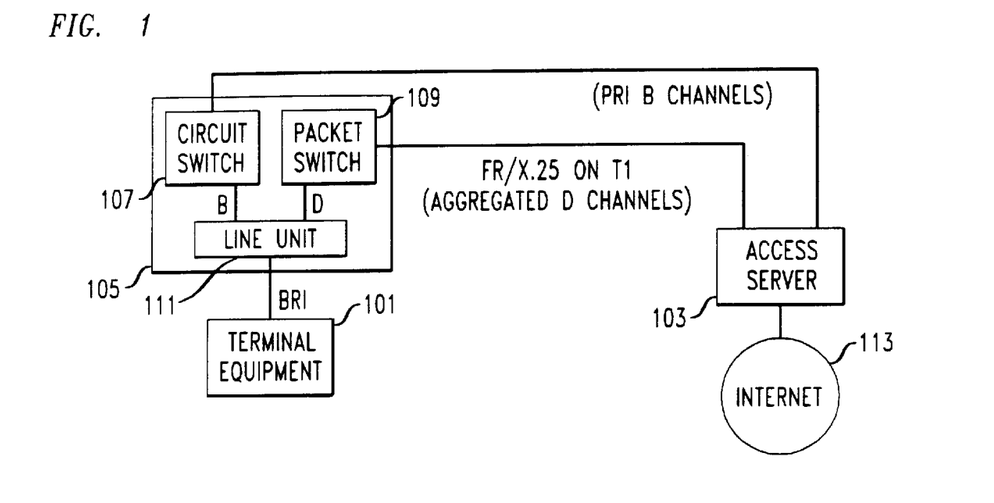
FIG. 1 shows an overview of a system for providing enhanced Internet service over an ISDN line which eliminates from the D-channel any packets that will introduce delay in packets transmitted over the B-channel, in accordance with the principles of the invention.

FIG. 1 shows an overview of a system for providing enhanced Internet service over an ISDN line which can be always on and which eliminates from the D-channel any packets that will introduce delay in packets transmitted over the B-channel in accordance with the principles of the invention. Shown in FIG. 1 are terminal equipment 101, access server 103, central office switch 105, and Internet 113.

Terminal equipment 105 is typically located at a user's location, the so-called "customer premises", and is connected to central office switch 105 via an integrated services digital network (ISDN) line. The ISDN line may support, for example the so-called basic rate interface (BRI), which carries two bearer (B) channels, each at 64 kilobits per second (Kbps), and one data (D) channel at 16 Kbps, which can be employed to carry user data, as well as additional signaling information which is used to keep the ISDN line operating.

Central office switch 105 receives the user data which is transmitted from terminal equipment 101 over the ISDN line and begins the process of directing that data along a path to the user specified destination, e.g., one within Internet 113. Likewise, central office switch 105 receives data that is destined for terminal equipment 101, and appropriately packages for transmission, and then transmits, that data over the ISDN line to terminal equipment 101. For example, data from Internet 113 that is destined for terminal equipment 101 may be received from access server 103.

As is well known in the art, loosely speaking, an access server is a device that terminates data arranged according to a particular protocol and acts as a bi-directional gateway for that protocol between a central office switch and a network which transports data formatted in that protocol. For example, access server 103 may a) terminate data received from central office switch 105, b) reformat the information received into a format, e.g., using Internet protocol (IP), that is proper for Internet 113, and c) route the resulting packets to Internet 113. Similarly, access server 103 1) receives packets from Internet 113 and 2) repackages the information therein into a format that can be switched by central office switch 105 and transmitted to terminal equipment 101, e.g., into circuit switched data for switching as B-channel data and X.25 packets for switching as D-channel data.

Central office switch 105 contains circuit switch 107, packet switch 109, and line unit 111. Central office switch 105 may be, for example a Number 5 Electronic Switching System (5ESS) switch manufactured by Lucent Technologies, Inc. Line unit 111 terminates the ISDN line. It receives data from the ISDN line and routes data from the B-channels to circuit switch 107 and from the D-channel to packet switch 109. Likewise, data destined for terminal equipment 101 that is received from circuit switch 107 is placed by line unit 111 onto the B-channels, while data that is received from packet switch 109 is placed by line unit 111 onto the D-channel.

Circuit switch 107 is a conventional circuit switch. It switches B-channel data between access server 103 and terminal equipment 101 via line unit 111. Packet switch 109 is a conventional packet switch. For example, packet switch 109 can switch link access protocol D-channel (LAPD) formatted packets, e.g., X.25 packets or frame relay packets. Packet switch 109 switches D-channel data between access server 103 and terminal equipment 101 via line unit 111.

Internet 113 may be any network that employs the transmission control protocol/Internet protocol (TCP/IP) protocol suite, or the like. For example, Internet 113 may be the well-known public access Internet. Internet 113 may also be a so-called "intranet", which is like a private version of the public access Internet. In addition, prior to reaching the public access Internet or an intranet, there may be additional routers which are included in Internet 113.

Figure 2:
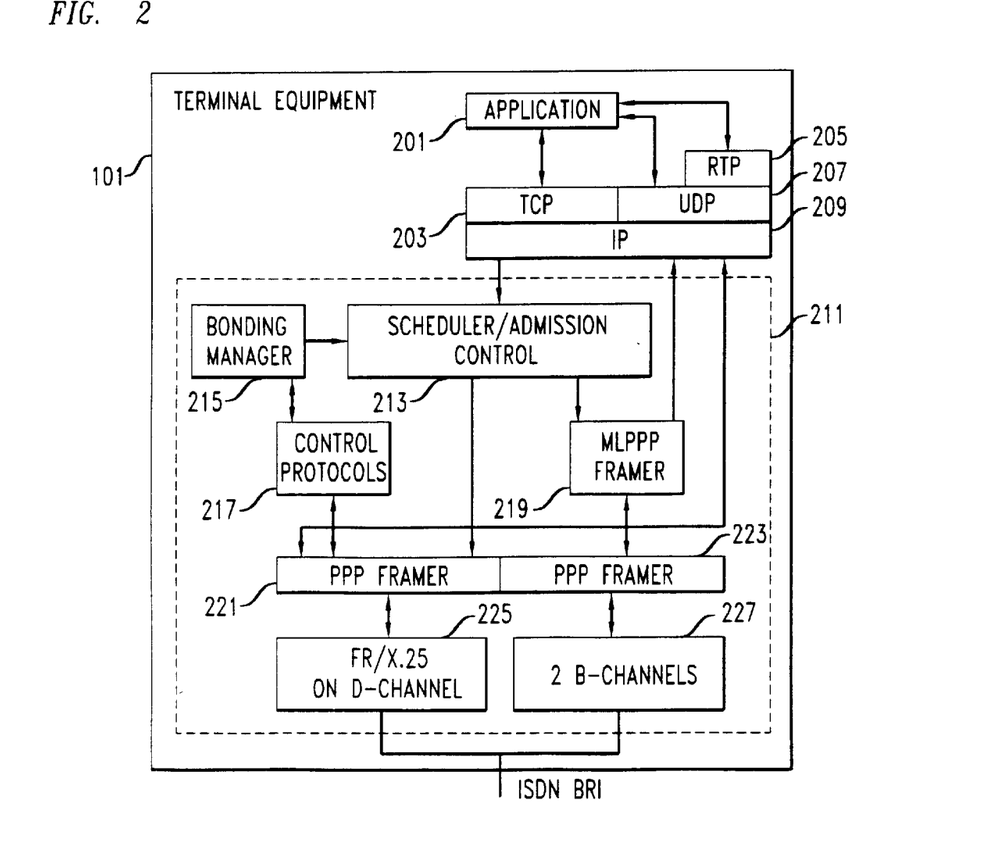
FIG. 2 shows an expanded version of an exemplary embodiment of terminal equipment shown in FIG. 1.

FIG. 2 shows an expanded version of an exemplary embodiment of terminal equipment 101. In the embodiment shown terminal equipment 101 includes application 201, several protocol implementing elements, such as transmission control protocol (TCP) implementing element 203, real time protocol (RTP) implementing element 205, user datagram protocol (UDP) implementing element 207, and Internet protocol (IP) implementing element 209, as well as link layer implementing element 211. Application 201 is a user's application that needs to communicate with, i.e., transmit information to and/or receive information from, Internet 113 (FIG. 1), e.g., a worldwide web browser, such as Netscape Navigator, available from Netscape Communications.

When application 201 has information to transmit to Internet 113, it supplies the information to the one of transmission control protocol (TCP) implementing element 203, real time protocol (RTP) implementing element 205, and user datagram protocol (UDP) implementing element 207. The appropriate implementing element is determined based on the type of data that is to be transmitted by application 201. Thus, according to one implementation, data that needs to be reliably transferred but does not have any time constraints, e.g., a file, a worldwide web page, application control information, or the like, is transmitted via transmission control protocol (TCP) implementing element 203. Continuous media applications, which include time constrained data, such as streamed audio and/or video, employs real time protocol (RTP) implementing element 205, and/or user datagram protocol (UDP) implementing element 207. The particular protocol actually employed is at the discretion of the implementor of the application.

Regardless of which of TCP, RTP/UDP and/or UDP is employed, the resulting packets supplied by TCP implementing element 203 or RTP implementing element 205 are supplied to IP implementing element 209. As is well known, IP is a layer-3 routing protocol which routes a packet from its current location to the appropriate intermediate router or final destination. Each packet, as formatted according to the IP protocol, is supplied from IP implementing element 209 to link layer implementing element 211.

The function of link layer implementing element 211 is to format IP packets for transmission over the D-channel and the 2 B-channels, so that they may be switched through central office switch 105 (FIG. 1) and reconstituted by access server 103. This function is performed in a way that eliminates from the D-channel any packets that will introduce delay in packets transmitted over the B-channel, in accordance with the principles of the invention. To this end, in accordance with an aspect of the invention, packets are segregated based on the stream to which the packets belong, so that packets of particular types of streams are designated to go over only the B-channels and not the D-channel, while packets of other types of streams are designated to go over the D-channel. Packets are transmitted over the B-channels using multilink point-to-point protocol (MLPPP), so that the packet load may be distributed over both B-channels, while data that is separately directed to the D-channel employs another protocol, e.g., point-to-point protocol, and such data is sent independent of any data on the B-channels, in accordance with yet another aspect of the invention.

More specifically, as shown in FIG. 2, link layer implementing element 211, includes a) scheduler/admission controller 213, b) bonding manager 215, c) control protocols 217, d) MLPPP framer 219, e) PPP framers 221 and 223, f) frame relay (FR)/X.25 on D-channel 225, and g) two B-channels 227.

The admission controller portion of scheduler/admission controller 213 classifies each packet received from IP implementing element 209 and places it in one of several queues. The particular queue into which any packet is placed is a function of one or more of the source, destination, and type information in the packet header. The particular function employed is specified by bonding manager 215. The scheduler portion of scheduler/admission controller 213 determines when a packet at the head of a queue will be transmitted. When a packet is read out of a queue for transmission it will go to MLPPP framer 219, if the packet is one that can go over a B-channel. Otherwise, if the packet is one that can go over a D-channel, it will be supplied to point-to-point protocol (PPP) framer 221. Also, for a packet that will go over a B-channel, the scheduler portion of scheduler/admission controller 213 determines whether the packet will go over the first B-channel or the second B-channel.

MLPPP framer 219 frames each packet supplied to it with the MLPPP header and trailer and passes the packet to PPP framer 223. The use of MLPPP enables the packets which are sent over multiple links, such as 2 B-channels, to be resequenced at the other end of the links so that the IP protocol element at each end of the links appears to be handling only a single channel. The MLPPP formatted packets are then transmitted to PPP framer 223.

Each of PPP framers 221 and 223 formats the packets they receive according to the PPP format. PPP framer 221 transmits its formatted packets to FR/X.25 on D-channel 225, which then formats the PPP packets as X.25 or frame relay, whichever is selected by the implementer, and transmits the result over the D-channel. Similarly, PPP framer 223 transmits its formatted packets for transmission over the B-channels. Note that PPP framer 223 is a synchronous framer, because the data transmitted in the B-channels is synchronous, while PPP framer 221 is asynchronous, because the packet data transmitted over the D-channel is asynchronous.

Control protocols 217 is used to perform certain functions, most of which are conventional. The functions of control protocols 217 are carried out through the use of packets which are generated by control protocols 217 and which are inserted as special PPP packets, e.g., link control protocol (LCP), into the packet stream. Control protocols 217 functions include, for example, a) authentication, b) obtaining an IP address from the server and supplying it to IP implementing element 209, and c) bandwidth allocation, which is used to inform the remote location of which links are being used. It is recommended that such control packets be segregated from the other traffic that is transmitted over the same link and given higher priority than such other traffic. Doing so expedites system response to control commands.

In addition, in accordance with an aspect of the invention, control protocols 217 is responsive to control messages, e.g., in one or more special packets, from access server 103 (FIG. 1), to reduce the bandwidth that is available over the D-channel. Such a reduction in bandwidth may be necessary if packet switch 109 is not properly engineered to handle at one time all the packets that may be sent via the various terminal equipment that are connected to central office switch 105 during certain peak user access periods. Conversely, in accordance with an aspect of the invention, control protocols 217 is responsive to special packets from access server 103 (FIG. 1) to increase the bandwidth that is available over the D-channel.

Bonding manager 215 is responsive to special packets from access server 103 to establish the function that specifies which packets may not be transmitted via the D-channel, in accordance with the principles of the invention. In addition, bonding manager 215 may specify the scheduling to be used for the two B-channels, on a per-stream basis. As above, a stream is defined by source, destination, and type information. Note that the source or destination information may include not only the source or destination address, but also the port of the source or destination.

In the reverse direction, to transport packets received from the Internet via the ISDN BRI to application 201, each of the above described elements of terminal equipment 101 operates essentially in reverse. However, instead of the IP packets which are output from MLPPP framer 219 going to scheduler/admission control 213, they are passed directly to IP implementing element 209. Likewise, all non-control protocols IP packets which are output from PPP framer 221, instead of going to scheduler/admission control 213, are passed directly to IP implementing element 209.

Figure 3:
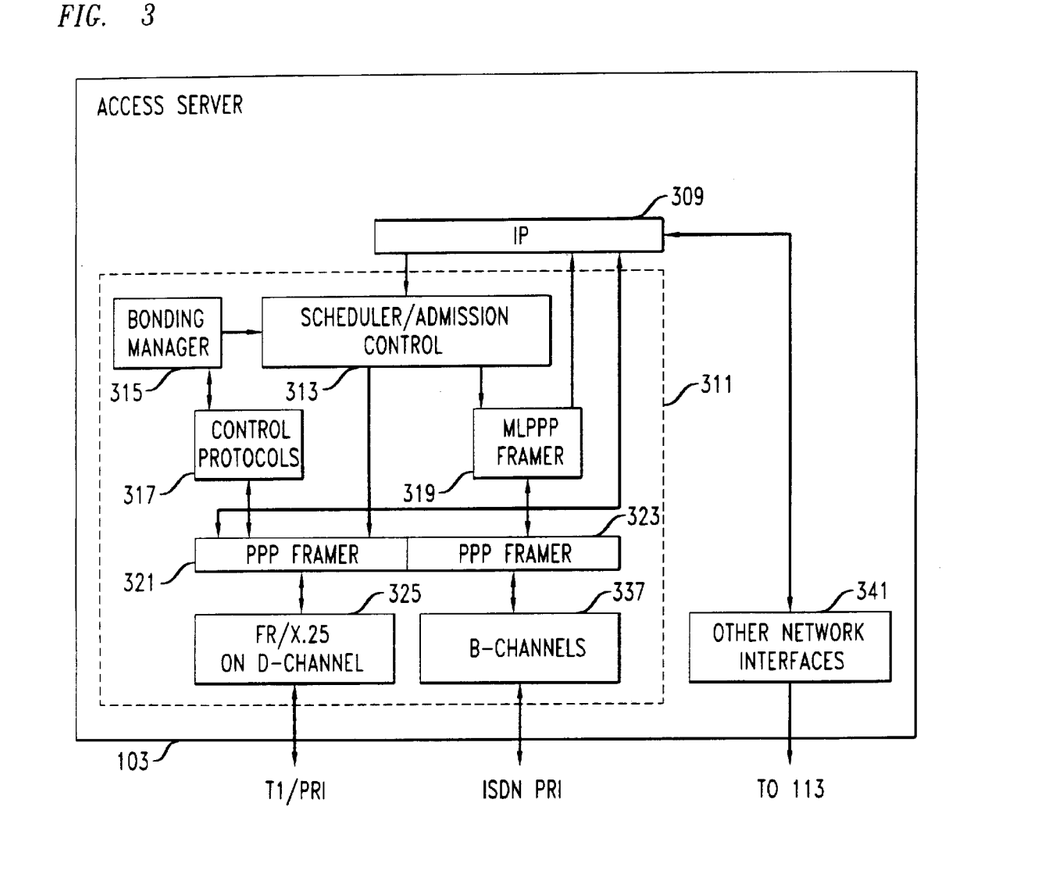
FIG. 3 shows an expanded version of an exemplary embodiment of an access server shown in FIG. 1.

FIG. 3 shows an expanded version of an exemplary embodiment of access server 103. Access server 103 is similar in structure to terminal equipment 101 as shown in FIG. 2. In the embodiment shown, access server 103 includes other network interfaces 341, Internet protocol (IP) implementing element 309, and link layer implementing element 311. Other network interfaces 341 receives information which is transmitted from the Internet and must be forwarded to application 201 of terminal equipment 101 (FIG. 2). The information received by other network interfaces 341 from IP implementing element 309 is supplied to Internet protocol (IP) implementing element 309, which formats the information according to the IP protocol.

Each packet, as formatted according to the IP protocol, is supplied from IP implementing element 309 to link layer implementing element 311. The function of link layer implementing element 311 is to take IP packets and format them for transmission over the D-channel and the 2 B-channels, so that they may be switched through central office switch 105 (FIG. 1) and reconstituted by terminal equipment 101 for application 201. This function is performed in a way that eliminates from the D-channel any packets that will introduce delay in packets transmitted over the B-channel, in accordance with the principles of the invention. To this end, in accordance with an aspect of the invention, packets are segregated based on the stream to which the packets belong, so that packets of particular types of streams are designated to go over only the B-channels and not the D-channel, while packets of other types of streams are designated to go over the D-channel. Packets are transmitted over the B-channels using multilink point-to-point protocol (MLPPP), so that the packet load may be distributed over both B-channels, while, in accordance with yet another aspect of the invention, data that is separately directed to the D-channel employs another protocol, e.g., point-to-point protocol, and such data is sent independent of any data on the B-channels.

More specifically, as shown in FIG. 3, link layer implementing element 311, includes a) scheduler/admission controller 313, b) bonding manager 315, c) control protocols 317, d) MLPPP framer 319, e) PPP framers 321 and 323, f) frame relay (FR)/X.25 on D-channel 325, and g) two B-channels 327.

The admission controller portion of scheduler/admission controller 313 classifies each packet received from IP implementing element 309 and places it one of several queues. The particular queue into which any packet is placed is a function of one or more of the source, destination, and type information in the packet header. The particular function employed is specified by bonding manager 315. The scheduler portion of scheduler/admission controller 313 determines when a packet at the head of a queue will be transmitted. When a packet is read out of a queue for transmission, it will go to MLPPP framer 319 if the packet is one that can go over a B-channel. Otherwise, if the packet is one that can go over a D-channel, it will be supplied to point-to-point protocol (PPP) framer 321. Also, for a packet that will go over a B-channel, scheduler portion of scheduler/admission controller 313 determines whether the packet will go over the first B-channel or the second B-channel.

MLPPP framer 319 frames each packet supplied to it with the MLPPP header and trailer and passes the packet to PPP framer 323. The use of MLPPP enables the packets which are sent over multiple links, such as two B-channels, to be resequenced at the other end of the links so that the IP protocol element at each end of the links appears to be handling only a single channel. The MLPPP formatted packets are then transmitted to PPP framer 323.

Each of PPP framers 321 and 323 formats the packets they receive according to the PPP format. PPP framer 321 transmits its formatted packets to FR/X.25 formatter which then formats the PPP packets as X.25, or frame relay, whichever is selected by the implementor and transmits the result over the D-channel. Similarly, framer 323 transmits its formatted packets for transmission over the B-channels. Note that PPP framer 323 is a synchronous framer, because the data transmitted in the B-channels is synchronous, while PPP framer 321 is asynchronous, because the packet data transmitted over the D-channel is asynchronous.

Control protocols 317 is used to perform certain functions, most of which are conventional. The functions of control protocols 317 are carried out through the use of packets which are generated by control protocols 317 and which are inserted as special PPP packets into the packet stream that is going over the D-channel. Control protocols 317 functions include, for example, a) authentication, b) providing an IP address to terminal equipment 101, and c) bandwidth allocation, which is used to inform the terminal equipment of which links are being used or to cause the terminal equipment to invoke one or more additional links.

In addition, in accordance with an aspect of the invention, control protocols 317 supplies special packets which are transmitted to control protocols 217 of terminal equipment 101 to reduce the bandwidth that is available over the D-channel. As noted above, such a reduction in bandwidth may be necessary if packet switch 109 is not properly engineered to handle at one time all the packets that may be sent via the various terminal equipment that are connected to central office switch 105 during certain peak user access periods.

One way to determine if packet switch 109 is overloaded is to measure the delay in PPP control packets, e.g., the link quality monitoring packets, which are routinely inserted in the PPP packet stream and which are timestamped. If the delay for the link quality monitoring packets exceeds a predetermined threshold—which is implementation dependent, can be determined by those of ordinary skill in the art, and may vary dynamically over time—then a control message, e.g., in a special packet, is transmitted to control protocols 217 of terminal equipment 101 to reduce the bandwidth that it is using on the D-channel. This process may be repeated with the same or different terminal equipment 101 that is connected to packet switch 109 until the delay through packet switch 109 is reduced to be at, or below, the threshold. Conversely, in accordance with an aspect of the invention, when the delay, as determined from the link quality monitoring packets, is less than the threshold, e.g., after packets to reduce the bandwidth have been transmitted and the overall system load drops, control protocols 317 may supply special packets to increase the bandwidth that is available over the D-channel.

Alternatively, a modified version of a conventional packet switch may periodically send control messages to the access server(s) indicating the bandwidth that it is currently handling. In yet another embodiment of the invention, access server 103 may be integrated with packet switch 109 of central office switch 105, so that packet loading or delay information may be communicated directly between them.

Bonding manager 315 is responsive to special packets from access server 103 to establish the function that specifies which packets may not be transmitted via the D-channel, in accordance with the principles of the invention. In addition, bonding manager 315 may specify the scheduling to be used for the two B-channels, on a per-stream basis. As above, a stream is defined by source, destination, and type information. Note that the source or destination information may include not only the source or destination address, but also the port of the source or destination.

In the reverse direction, to transport packets received from the ISDN BRI to the Internet, each of the above described elements of access server 103 operates essentially in reverse. However, instead of the IP packets which are output from MLPPP framer 319 going to scheduler/admission control 313, they are passed directly to IP implementing element 309. Likewise, all non-control protocols IP packets which are output from PPP framer 321, instead of going to scheduler/admission control 313, are passed directly to IP implementing element 309.

Generally, operation of the system is as follows. Initially only PPP traffic is used on the D-channel. Unless specifically restricted, even real time traffic such as low bitrate audio will use the D-channel. As soon as the first B-channel is added to the D-channel, which occurs when the bandwidth exceeds that which can be carried on the D-channel alone, a multilink bundle between the B and D channel is created. IP traffic, that is not restricted only to the B-channels or only to the D-channel are split into MLPPP fragments and transmitted using all available links, including the D-channel. This is really useful for applications whose bandwidth requirement suddenly changes from low to high, for example, e-mail or direct messaging applications.

After a B channel is initiated and combined with, i.e., so-called "bonded" to, a D-channel, only specifically allowed real time data streams, such as low bitrate audio, will be carried in the D-channel. In fact, such applications will never be able to benefit from the higher bandwidth that is now available. All other real time applications, e.g., as specified by the RTP/UDP protocol type, or specific IP Address/port number patterns, will never be scheduled for transmission via the D-channel but instead will be transmitted via one of the B-channels. Thus video conferencing, high bitrate audio/video streaming applications will use only one or two B-channels for their transmission.

As an additional optimization, if the IP packet itself is very small, it will not be sent in the D-channel but the B-channels will be used.

Notwithstanding the foregoing, it is still possible to send some IP traffic in the D-channel more efficiently, i.e., without requiring the overhead engendered by the use of MLPPP, by specifying a traffic descriptor that causes all IP packets of a specific stream to always be scheduled for transmission via the D-channel. Note that this should be done only for applications whose bandwidth requirements will always fit which the D-channel constraints, which may be so-called "always on" applications. Such always on applications include remote device control over power lines, e.g., for controlling appliances and lights within a home, low bitrate audio, active directory maintenance, and low bitrate information push applications.

In addition, certain traffic may be restricted to being transmitted only on the D-channel, even when their bandwidth requirements temporarily exceeds the available D-channel bandwidth and thus would otherwise invoke the use of a B-channel. This may be done for certain bursty traffic which on average meet the D-channel requirements but for short periods may appear to require the use of a B-channel. Advantageously, for such traffic, the extra cost of opening a B-channel is avoided.

Figure 4:
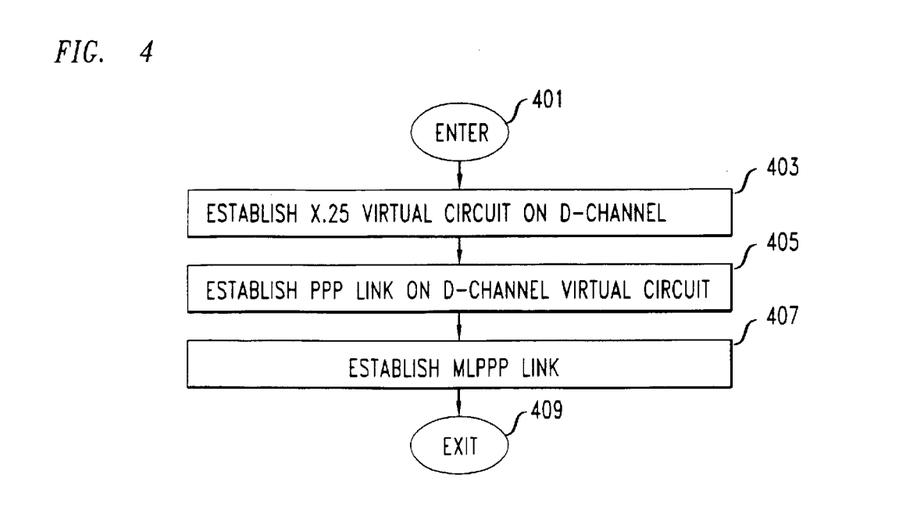
FIG. 4 shows an exemplary process for establishing an initial link layer connection carrying IP formatted packets over an ISDN D-channel for use in accordance with the invention.

FIG. 4 shows an exemplary process for establishing an initial link layer connection carrying IP formatted packets over an ISDN D-channel for use in accordance with the invention. The process is entered, in step 401, to establish a connection to the Internet in response to initialization of terminal equipment 101 (FIG. 1). Next, in step 403 (FIG. 4), an X.25 virtual circuit over which user information will be transported is established on the D-channel. This virtual circuit is established from terminal equipment 1O1 (FIG. 1) to access server 103 via central office switch 105. Next, in step 405 (FIG. 4), a PPP link is established on top of the X.25 virtual circuit. An MLPPP link is established on top of the PPP link in step 407. Thereafter, the process exits in step 409, with all the links being in a so-called "quiescent" state.

Generally, by default, the link over the D-channel will be the only link that will be active. The number of IP packets arriving at scheduler/admission controller 213 (FIG. 2) during a time window—which slides with each packet and has a length that is determinable by the user, and may be changed dynamically—is employed to calculate the bandwidth required for the connection to the Internet. This bandwidth information is then used in deciding whether or not multiple links are needed to provide adequate service. If scheduler/admission controller 213 finds the bandwidth to be less than that of the available virtual circuit bandwidth, it schedules a received IP packet for the D-channel by placing it on a queue of packets to be transmitted via the D-channel. The IP packets are encapsulated by PPP framing, which in turn is encapsulated by X.25 framing (LAPD), before transmission in the D-channel on the ISDN physical layer. If scheduler/admission controller 213 finds the bandwidth to be greater than that of the available virtual circuit bandwidth but less than the bandwidth of the D-channel and one B-channel, it creates an MLPPP link on a first B-channel, if one does not already exist. The packet is then scheduled for transmission in the D-channel or the B-channel, as a function of the type of packet that it is, in accordance with the principles of the invention, by placing the packet in a queue associated with the channel over which the packet will be transmitted. If scheduler/admission controller 213 finds the bandwidth to be greater than the bandwidth of the D-channel and one B-channel, it creates an MLPPP link on both the first and the second B-channels, if one does not already exist. The packet is then scheduled for transmission in the D-channel, or in one of the two B-channels, as a function of the type of packet that it is, in accordance with the principles of the invention. This is done by placing the packet in a queue associated with the channel over which the packet will be transmitted.

Figure 5:
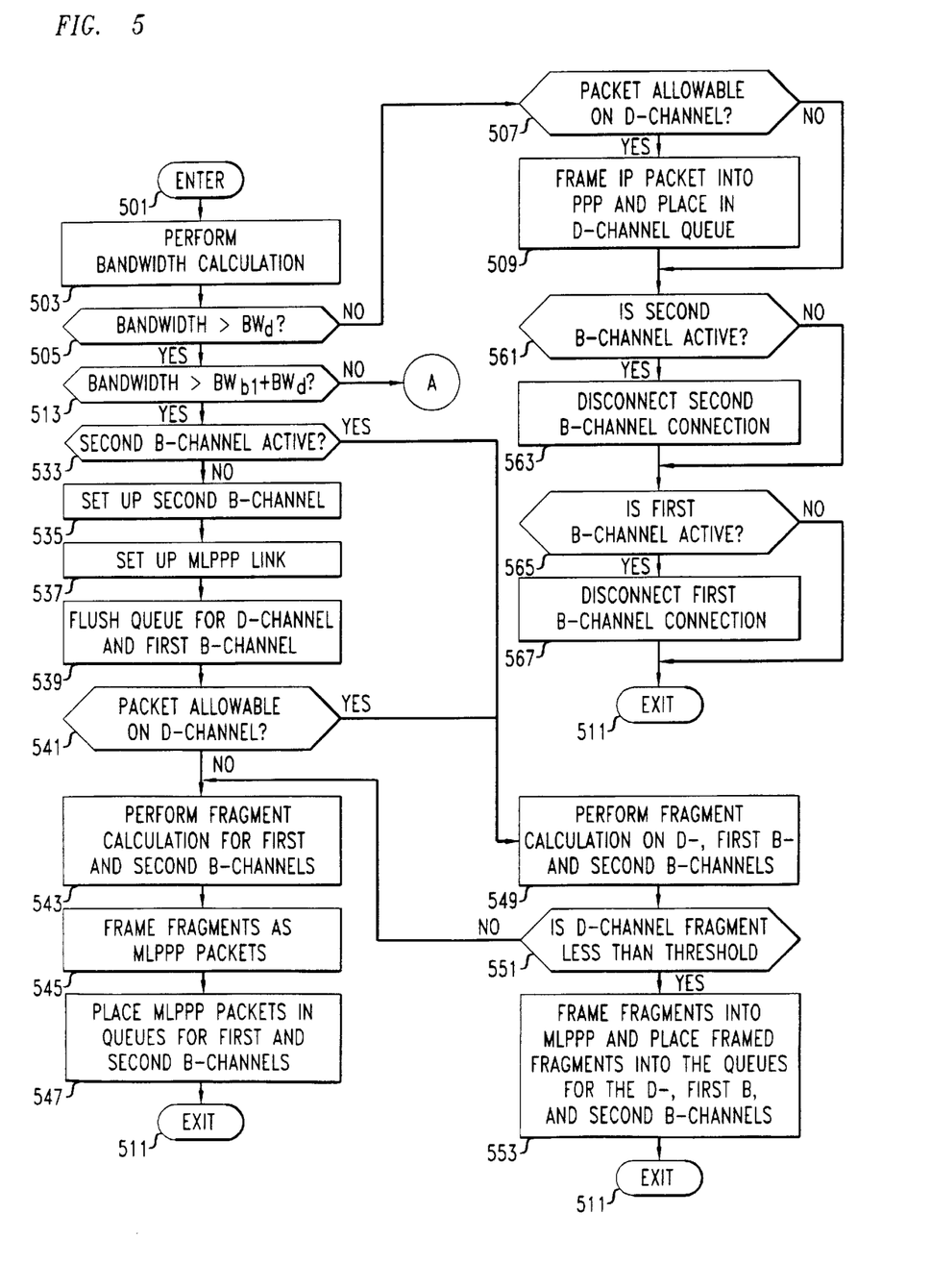
FIGS. 5 and 6, when connected together, show a flow chart of an exemplary process for use in assigning packets to one of the available ISDN channels, in accordance with the principles of the invention.
Figure 6:
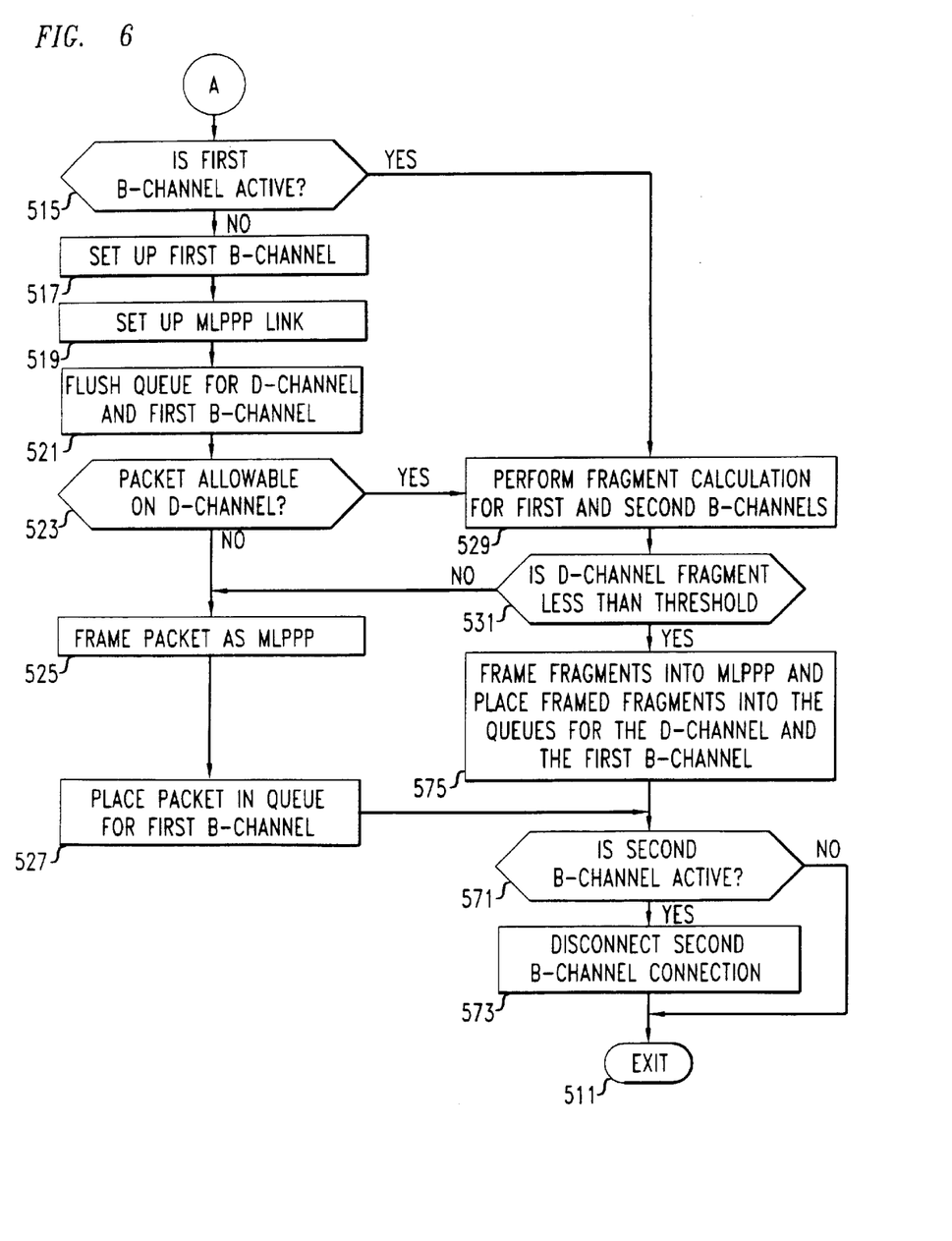

FIGS. 5 and 6, when connected together, show a flow chart of an exemplary process for use by scheduler/admission controller 213 in assigning packets to one of the available ISDN channels, in accordance with the principles of the invention. The process is entered in step 501 when the system is in the quiescent state and a packet is received at scheduler/admission controller 213. Scheduler/admission controller 213 determines the bandwidth of packets coming from terminal equipment 101 during the current window, in step 503. Next, conditional branch point 505 tests to determine if bandwidth is greater than the bandwidth that is available over the D-channel ($BW_d$).

If the test result in step 505 is NO, control passes to step 509, in which the IP packet is framed into a PPP packet and placed into the queue of data packets for transmission via the D-channel. Note that this data packet queue is a low priority queue because control messages which are transmitted via the D-channel must be given a higher priority than data that is transmitted via the D-channel.

The process for transmitting the IP packet is essentially complete. However, it is necessary, since the bandwidth required can be met by the D-channel alone, to insure that only the D-channel is carrying IP packets. Therefore, control passes to conditional branch point 561, which tests to determine if the second B-channel is active. If the test result in step 561 is YES, control passes to step 563, and the connection over the second B-channel is taken down. If the test result in step 561 is NO, or after completing step 563, control passes to conditional branch point 565, which tests to determine if the first B-channel is active. If the test result in step 565 is YES, control passes to step 567, and the connection over the second B-channel is taken down. Note that in any step calling for taking down a B-channel it is necessary to mark the B-channel to be taken down and to actually take it down only upon the emptying of its queue. This process is known as flushing the queue. If the test result in step 565 is NO, or after completing step 567, control passes to step 511, in which the process is exited as the system returns to the quiescent state.

Optionally, if the test result in step 507 is NO, a process may be undertaken to create a connection over a B-channel, as described hereinbelow, and the packet transmitted via the B-channel connection.

If the test result in step 505 is YES, control passes to conditional branch point 513, which tests to determine if the bandwidth calculated in step 503 is greater than that is available over the D-channel and a one of the B-channels. If the test result in step 513 is NO, indicating that the bandwidth requirements can be met by the D-channel and a first of the B-channels, control passes to conditional branch point 515, which tests to determine if the first one of the B-channels is already active. If the test result in step 515 is NO, indicating that the only channel currently in use for connection to the Internet is the D-channel, control passes to step 517, in which a connection from terminal equipment 101 to access server 103 is established over the first B-channel. In step 519, an MLPPP link is established over the B-channel and the D-channel. When the MLPPP link is established over the B-channel it is bonded, in accordance with the MLPPP protocol, to the MLPPP link on the D-channel. Next, in step 521, the queue of data packets for the D-channel is flushed, i.e., emptied by transmitting the packets over the D-channel without letting any additional packets into the queue at this time. Unless all the packets already queued for the D-channel are flushed, there may be sequencing and reordering problems with the packets that are queued for transmission by the D-channel, thus increasing the latency of such packets.

Thereafter, conditional branch point 523 tests to determine if the packet is of the type that is permitted to be transmitted via the D-channel, in accordance with the principles of the invention. If the test result in step 523 is NO, indicating that the current packet may not be transmitted on the D-channel, control passes to step 525, in which the IP packet is framed into an MLPPP packet. The MLPPP packet is then placed in the queue for the first B-channel in step 527. Ultimately the MLPPP packet will come to the head of the first B-channel queue and be transmitted via the B-channel.

If the test result in step 523 is YES, indicating that the current IP packet may be transmitted on the D-channel, control passes to step 529, in which fragment calculation of the IP packet is performed for the D- and first B-channels. This fragment calculation a calculation performed to determine a) how much of the IP packet, e.g., how many bytes thereof, should be transmitted on the D-channel and b) how much of the IP packet should be transmitted on the first B-channel. Thereafter, conditional branch 531 tests to determine if the D-channel fragment, i.e., portion, is less than a predetermined threshold, in accordance with an aspect of the invention. This threshold is set, typically administratively, by bonding manager 215. If the fragment length is less than the threshold, the packet fragment should not be sent over the D-channel, because it is inefficient to do so, e.g., the overhead added to the fragment to transmit it via the D-channel is large, such as on the order of the size of the fragment itself. If this is the case, then the test result in step 531 is NO, and control passes to step 525 to transmit the entire packet over the B-channel. If the test result in step 531 is YES, indicating that it is efficient to send at least a portion of the IP packet over the D-channel, control passes to step 575, in which the D- and B-channel fragments of the IP packet are framed into MLPPP packets which are placed into their respective corresponding queues for the D- and B-channels.

At this point, the process for transmitting the IP packet is essentially complete. However, since the bandwidth required can be met by the combination of the first B-channel and the D-channel alone, there is no need for the second B-channel. Therefore, control passes from step 527 or step 575 to conditional branch point 571, which tests to determine if the second B-channel is active. If the test result in step 571 is YES, control passes to step 573, and the connection over the second B-channel is taken down. If the test result in step 571 is NO, or after completing step 573, control passes to step 511 in which the process is exited as the system returns to the quiescent state.

If the test result in step 513 is YES, indicating that the bandwidth requirements cannot be met by the D-channel and a first of the B-channels, control passes to conditional branch point 533, which tests to determine if the second one of the B-channels is already active. If the test results in step 533 is NO, indicating that the only channels currently in use for connection to the Internet are the D-channel and the first B-channel, control passes to step 535, in which a connection from terminal equipment 101 to access server 103 is established over the second B-channel. In step 537, an MLPPP link is set up over the second B-channel and this MLPPP link over the second B-channel is bonded, in accordance with the MLPPP protocol, to the MLPPP link already existing on the D-channel and the first B-channel. Next, in step 539, the queue of data packets for the D-channel and the queue of packets for the first B-channel are flushed, i.e., emptied by transmitting the packets over the D-channel and the first B-channel without letting any additional packets into the queue at this time. Unless all the packets already queued for the D-channel are transmitted, there may be sequencing and reordering problems with the packets that are queued for transmission by the D-channel, thus increasing the latency of such packets.

Thereafter, conditional branch point 541 tests to determine if the packet is of the type that is permitted to be transmitted via the D-channel, in accordance with the principles of the invention. If the test result in step 541 is NO, indicating that the current packet may not be transmitted on the D-channel, control passes to step 543, in which fragment calculation is performed so that the IP packet may be broken into portions which are transmitted over the first and second B-channels. Next, in step 545, fragments are framed as MLPPP packets. The MLPPP packet are then placed in the queue of the first or second B-channel, as appropriate, in step 547. The process then exits in step 511. Ultimately the MLPPP packets will come to the head of queue into which they were placed and be transmitted via the B-channel associated therewith.

If the test result in step 541 is YES, indicating that the current IP packet may be transmitted on the D-channel, control passes to step 549, in which fragment calculation of the IP packet is performed for the D-, and first and second B-channels. This fragment calculation is a calculation performed to determine how much of the IP packet, e.g., how many bytes thereof, should be transmitted on each of the D-channel, the first B-channel and the second B-channel. Thereafter, conditional branch 551 tests to determine if the D-channel fragment, i.e., portion, is less than a predetermined threshold, in accordance with an aspect of the invention. This threshold is set, typically administratively, by bonding manager 215. If the fragment length is less than the threshold, the packet fragment should not be sent over the D-channel, because it is inefficient to do so, e.g., the overhead added to the fragment to transmit it via the D-channel is large, such as on the order of the size of the fragment itself. If this is the case, then the test result in step 551 is NO, and control passes to step 543 to transmit the entire packet over only the first and second B-channels, as described above.

If the test result in step 551 is YES, indicating that it is efficient to send at least a portion of the IP packet over the D-channel, control passes to step 553, in which the D-, first B- and second B-channel fragments are framed into MLPPP packets which are placed into their respective corresponding queues for the D-, first B- and second B-channels. The process then exits in step 511. Ultimately the MLPPP packets will come to the head of the queue into which they were placed and be transmitted via the D-channel or the one of the B-channels associated therewith.

Note that, in the reverse direction, the process of FIGS. 5 and 6 is performed by scheduler/admission controller 313 (FIG. 3).

The foregoing does not directly consider the implications of an existing circuit switched call on one of the B-channels or an incoming circuit switched call, e.g., voice or fax, which is arriving over one of the B-channels, which may be indicated by a Q.931 call indication control message on the D-channel at the time it is determined that an additional B-channel is needed. In such situations it is necessary to implement a policy as to which traffic receives priority to use the available bandwidth. The implementor may make available to the user one or more choices of policies. Such policies may include, for example, giving priority to the data traffic and not answering an incoming circuit switched call or denying the B-channel to the data traffic and applying prioritization to the streams within the data traffic.

In another exemplary embodiment of the invention, the D-channel of the central office switch supporting the ISDN line is supplemented to support frame relay. This enables the packets sent over the D-channel to be in frame relay format, which can provide performance improvement over X.25. The frame relay packets are automatically routed to the access server.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. A method for use in providing Internet-like service over an integrated services digital network (ISDN) line having at least two bearer (B)-channels and one data (D)-channel, said method being for use when said D-channel and at least one of said B-channels are simultaneously active for carrying packets that make up a plurality of interspersed streams of said Internet-like service, the method comprising the steps of:

determining external to an application generating a packet and based only on information available external to said application whether or not said packet belongs to one of said streams that is of a type that cannot withstand a delay which may be encountered if said packet is transmitted over said D-channel; and transmitting said packet over one of said B-channels if said determination is that said packet belongs to one of said streams that is of a type that cannot withstand a delay which may be encountered if said packet is transmitted over said D-channel.

2. The invention as defined in claim 1 wherein said determining step is performed by examining destination and type information in a header of said packet.

3. The invention as defined in claim 1 wherein said determining step is performed by examining source and type information in a header of said packet.

4. The invention as defined in claim 1 wherein, if said determination is that said packet does not belong to one of said streams that is of a type that cannot withstand a delay which may be encountered if said packet is transmitted over said D-channel, transmitting said packet over one of said B-channels if doing so improves system performance.

5. The invention as defined in claim 1 wherein, in said determining step, said packet is determined to belong to one of said streams that is of a type that cannot withstand a delay which may be encountered if said packet is transmitted over said D-channel when said packet contains data for a continuous media application.

6. The invention as defined in claim 5 wherein said continuous media application includes at least one from the set consisting of: voice and video.

7. The invention as defined in claim 1 wherein, if said determination is that said a packet does not belong to one of said streams that is of a type that cannot withstand a delay which may be encountered if said packet is transmitted over said D-channel, transmitting said packet over said D-channel.

8. The invention as defined in claim 7 wherein, in said determining step, said packet is determined to not belong to one of said streams that is of a type that cannot withstand a delay which may be encountered if said packet is transmitted over said D-channel when said packet contains data for an application of at least one of the following types: push-content model applications, active directory application, and home appliance related applications.

9. The invention as defined in claim 7 wherein said packet is transmitted over said D-channel in a frame relay format.

10. A method for use in providing Internet-like service over an integrated services digital network (ISDN) line having at least two bearer (B)-channels and a data (D)-channel, said method being for use when said D-channel and at least one of said B-channels are simultaneously active for carrying packets that make up a plurality of interspersed streams of said Internet-like service, the method comprising the step of:

segregating said packets as a function of a type of stream to which they belong, so that at least one stream of said segregated packets is transmitted only on one or more of said at least two B-channels regardless of the availability of bandwidth on said D-channel, said function being performed external to any applications generating said packets and based only on information available external to said applications.

11. The invention as defined in claim 10 wherein packets of a stream of said plurality of streams that cannot withstand a delay which may be encountered if said packet is transmitted over said D-channel are segregated in said segregating step.

12. The invention as defined in claim 10 wherein said at least one stream the packets of which are segregated is transmitted, as a function of availability of bandwidth, on either said D-channel or any of said at least two B-channels.

13. The invention as defined in claim 10 wherein at least one stream the packets of which are segregated is transmitted only on said D-channel regardless of the availability of bandwidth on any of said at least two B-channels.

14. A method for use in providing Internet-like service for a plurality of interspersed streams each of said streams being made up of packets, over an integrated services digital network (ISDN) line having simultaneously active at least one bearer (B)-channel and one data (D)-channel for providing said Internet-like service, the method comprising the step of preventing ones of said packets, as a function of the type of stream to which said packets belong, from being transmitted over said one D-channel, said function being performed external to any applications generating said packets and based only on information available external to said applications.

15. The invention as defined in 14 wherein said ones of said packets which are prevented in said preventing step from being transmitted over said one D-channel cannot withstand a delay which may be encountered if said ones of said packets are transmitted over said D-channel.

16. A method for use in providing Internet-like service for a plurality of interspersed streams, each of said streams being made up of packets, over an integrated services digital network (ISDN) line having simultaneously active at least one bearer (B)-channel and one data (D)-channel for providing said Internet-like service, the method comprising the step of limiting packets, as a function of the type of stream to which they belong, to being transmitted only over one or more of said B-channels even when bandwidth is available on said one D-channel said function being performed external to any applications generating said packets and based only on information available external to said applications.

17. A method for use in providing Internet-like service for a plurality of interspersed streams, each of said streams being made up of packets over an integrated services digital network (ISDN) line having simultaneously active at least one bearer (B)-channel and one data (D)-channel for providing said Internet-like service, the method comprising the step of supplying packets of a particular identified type of stream for transmission only over one or more of said B-channels regardless of availability of bandwidth on said one D-channel packets of said stream being identified external to any applications generating said packets and based only on information available external to said applications.

18. A method for use in providing Internet-like service for a plurality of interspersed streams each of said streams being made up of packets over an integrated services digital network (ISDN) line having simultaneously active at least one bearer (B)-channel and one data (D)-channel for providing said Internet-like service, the method comprising the step of limiting packets, as a function of the type of stream to which they belong, to being transmitted only over said one D-channel even though bandwidth is available on at least one of said B-channels, said function being performed external to any applications generating said packets and based only on information available external to said applications.

19. A method for use in providing Internet-like service for a plurality of interspersed streams, each of said streams being made up of packets, over an integrated services digital network (ISDN) line having at least two bearer (B)-channels and one data (D)-channel, said method being for use when said D-channel and at least one of said B-channels are simultaneously active for carrying said Internet-like service, the method comprising the steps of:

determining, external to an application generating a packet and based only on information available external to said application whether or not said packet belongs to one of said streams that is of a type that can withstand a delay which may be encountered if said packet is transmitted over said D-channel; and     transmitting said packet over said D-channel if said determination is that said packet belongs to one of said streams that is of a type that can withstand a delay which may be encountered if said packet is transmitted over said D-channel.

20. The invention as defined in claim 19 wherein said packet is transmitted in said transmitting step using frame relay protocol.

21. A method for use in providing Internet-like service over an integrated services digital network (ISDN) line having at least two bearer (B)-channels and one data (D)-channel, said method being for use when said D-channel and at least one of said B-channels are simultaneously active for carrying packets that make up a plurality of interspersed streams of said Internet-like service, comprising the steps of:

determining, external to an application generating a packet and based only on information available external to said application, whether or not said packet belongs to one of said streams that is of a type that cannot withstand a delay which may be encountered if said packet is transmitted over said D-channel; and     preventing said packet from being transmitted over said D-channel if said determination is that said packet belongs to one of said streams that is of a type that cannot withstand a delay which may be encountered if said packet is transmitted over said D-channel.

22. A controller for use in providing Internet-like service for a plurality of interspersed streams, each of said streams being made up of packets over an integrated services digital network (ISDN) line having at least one bearer (B)-channels and one data (D)-channel, wherein packets are transmitted between one or more user terminals to an access server over said D-channel via a packet switch, said user terminal comprising:

means for transmitting packets via said D-channel;

means for transmitting packets via said at least one bearer (B)-channels; and     means for segregating packets belonging to one of said streams of a first type and preventing packets of said stream of said first type from being transmitted via said D-channel so long as at least one of said B-channels is active said means for segregating being external to any applications generating said packets and employing only information available external to said applications.

23. The invention as defined in claim 22 further wherein said packets of said stream of said first type are part of a continuous media stream.

24. The invention as defined in claim 22 further wherein said D-channel carries user data packets and control packets.

25. The invention as defined in claim 22 further wherein packets transmitted via said D-channel are in frame relay format.

26. The invention as defined in claim 22 wherein said means for segregating comprises a queue for packets to be transmitted via said D-channel and a queue for packets to be transmitted via at least one of said B-channels.

27. The invention as defined in claim 22 wherein said means for segregating comprises a queue for packets to be transmitted via said D-channel and a plurality of queues for packets to be transmitted said B-channels, at least queue being for each B-channel that is active for transmitting packets.

28. The invention as defined in claim 22 wherein said means for segregating comprises:

a queue for packets to be transmitted via said D-channel and a queue for packets to be transmitted via at least one of said B-channels; and     means for flushing said queue for packets to be transmitted via said D-channel upon activation of at least one of said B-channels.

29. A method for operating an integrated services digital network (ISDN)-type line to transport data packets of interspersed streams that make up an Internet-like service, the method being characterized by the step of:

transmitting packets of a first stream type only over a bearer-type channel of said ISDN-type line after at least one bearer-type channel is established and so long as at least one bearer type channel remains established said packets being determined to be of said first stream type external to any applications generating said packets and based only on information available external to said applications.

30. A method for operating an integrated services digital network (ISDN)-type line to transport data packets, the method being characterized by the steps of:

transmitting packets of a first type only over a bearer-type channel of said ISDN-type line after at least one bearer-type channel is established and so long as at least one bearer type channel remains established; and     transmitting packets of a second type over a combination of a data channel and said bearer channel.

31. The invention as defined in claim 29 wherein a first bearer-type channel is established when bandwidth of said data packets exceeds the available bandwidth on a data-type channel of said ISDN-type line.

32. The invention as defined in claim 29 wherein a second bearer-type channel is established when bandwidth of said data packets exceeds the available bandwidth on combination of a data-type channel of said ISDN-type line and a first bearer-type channel of said ISDN line.

* * * * *